United States Patent [19]

Barcas

[11] Patent Number: 5,663,221
[45] Date of Patent: Sep. 2, 1997

[54] METHOD FOR THE PRODUCTION OF MDF BOARDS BASED ON SUNFLOWER SEED HUSKS

[75] Inventor: Demetrio Carlos Barcas, Bs.Aires, Argentina

[73] Assignee: Nidera Sociedad Anonima, Buenos Aires, Argentina

[21] Appl. No.: 607,153

[22] Filed: Feb. 26, 1996

[51] Int. Cl.$^6$ .............................. C08L 1/02; B27N 3/04; B27N 3/12; B27J 7/00
[52] U.S. Cl. ............................ 524/15; 264/109; 264/122; 264/126
[58] Field of Search ....................... 264/109, 122, 264/126; 524/15

[56] References Cited

U.S. PATENT DOCUMENTS 3,927,235  12/1975  Chow ....................................... 264/122

FOREIGN PATENT DOCUMENTS

| | | |
|---|---|---|
| 72346 | 7/1949 | Argentina . |
| 81487 | 9/1951 | Argentina . |
| 173944 | 11/1969 | Argentina . |
| 174901 | 2/1970 | Argentina . |
| 199988 | 10/1974 | Argentina . |
| 202331 | 5/1975 | Argentina . |
| 217725 | 4/1980 | Argentina . |
| 218441 | 6/1980 | Argentina . |
| 225361 | 8/1980 | Argentina . |
| 219692 | 9/1980 | Argentina . |
| 225752 | 4/1982 | Argentina . |
| 208633 | 2/1988 | Argentina . |
| 5013331 | 6/1994 | Russian Federation . |
| 1724619 | 4/1992 | U.S.S.R. . |

*Primary Examiner*—Peter A. Szekely

[57] ABSTRACT

Medium density fiber boards having sufficient physical strength are made from sunflower seed husks by an efficient method. The method of forming the boards involves impregnanting sunflower seed husks with steam, digesting so as to de-fibrate the husks, mixing the de-fibrated sunflower seed husks with a resin, drying the mixture and pressing the dried mixture into a medium density fiber board.

7 Claims, 1 Drawing Sheet

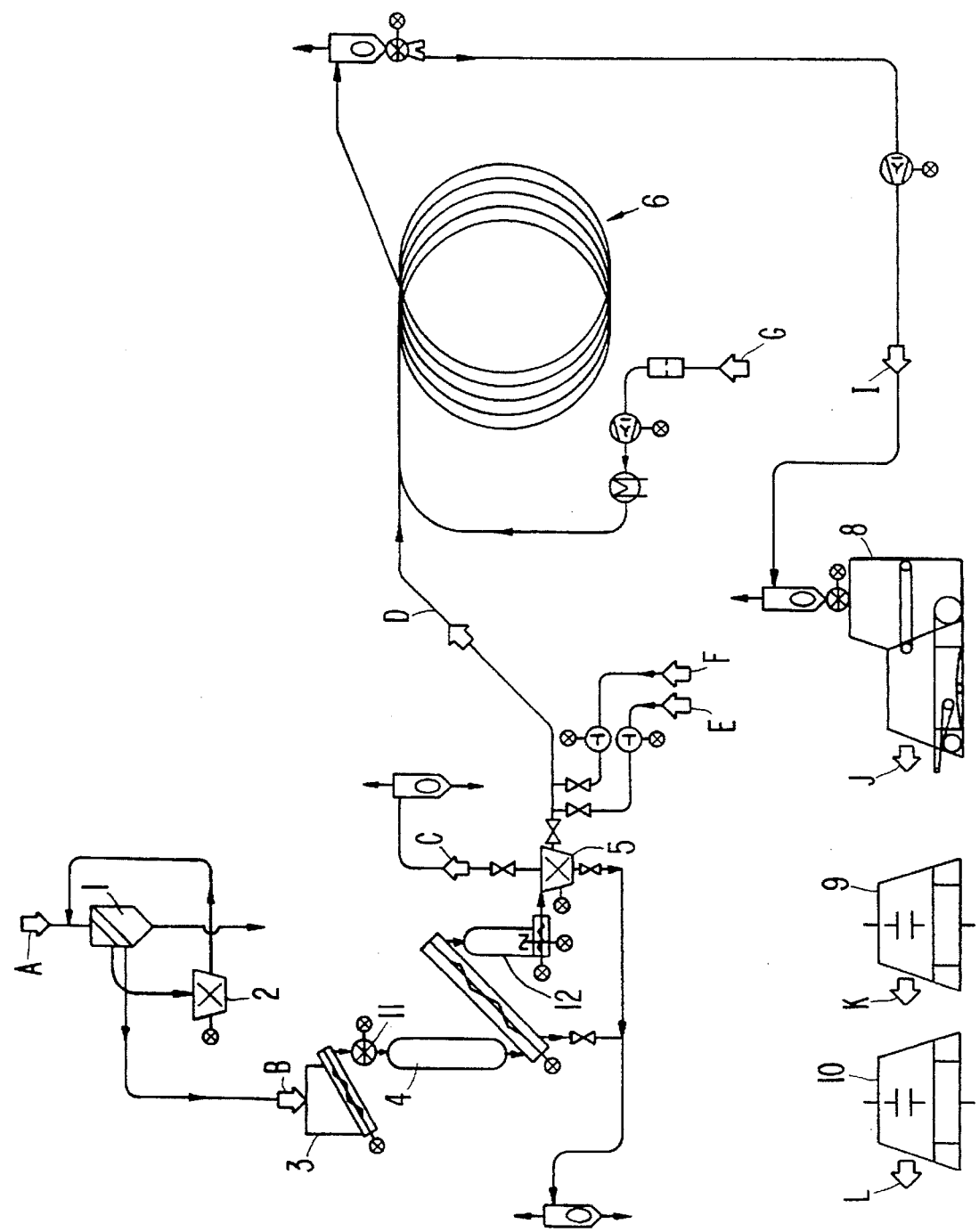

METHOD FOR THE PRODUCTION OF MDF BOARDS BASED ON SUNFLOWER SEED HUSKS

BACKGROUND OF THE INVENTION

1. Field of the Invention

This invention refers to a method for manufacturing boards made up of a mixture that mainly contains derivatives of sunflower seed husks and more particularly to boards obtained from raw material consisting in fibers of sunflower seed husks.

2. Description of the Related Arts

The sunflower seed husk is a waste material which is generated as a by-product in the process of producing sunflower oil.

Up to now the main application of this by-product was its use as fuel to obtain the energy necessary for that same oil production process, thus using only a part thereof. It is also used, though to a lesser extent, as a bed for fowl houses.

The fiber of this vegetable by-product, which is digestible and has a length similar to that of certain wood showed that the husk of this seed was a potential raw material for the production of MDF boards similar to wooden boards.

These MDF boards, which are generally used in the construction industry to replace wooden planks, are made up of particles or fibers pressed together with a binding element.

The most well-known of these boards are the planks made of wooden particles or MDF boards, structural boards of the OSB-type (oriented-structure boards) which replace plywood, gypsum boards, which are a mixture of fibers and plaster replacing materials previously used in construction partition walls, and boards of the MDF-type (Medium Density Fiberboard), which replace solid wood planks.

Different types of vegetable fibers, particularly coming from different kinds of wood and also from fibrous stems as the cotton stem and the sugar cane bagasse, are used in the manufacture of boards of the MDF-type.

The fiber and gypsum boards used in the building industry are made of a mixture of gypsum with cellulosic fibers obtained from wood or pulp obtained from coarse paper and other materials such as pearlite mineral, lime, starch, potassium sulfate or binder.

Preliminary studies have shown that the use of this biomass of sunflower husks to replace wood for its use in the manufacture of particle boards using conventional methods did not have successful results as the minimum necessary characteristics in the final product were not obtained.

The known MDF-type boards are obtained from different types of wood subjected to a transformation process in little pieces which are later classified.

These pieces, after a cleaning and washing process, are subjected, along with heat and steam pressure, to a mechanic process for the removal of fibers by means of especially designed refining discs.

The fiber is then mixed with a binding resin and other chemicals, then passes through a drying process and next, by means of special conveyors, the mixture is carried to a mattress formation and pressing station, where the board is given its shape and consistency.

Methods for the production of boards from wood particles or the like have been described in Argentine patents No. 72,346; No. 81,487; No. 173,944; No. 174,901; No. 199,988; No. 202,331; No. 208,633; No. 218,441; No. 217,725; No. 219,692; No. 225,631 and No. 225,752 but none of these patents have disclosed that the raw material used comes from sunflower seed husks.

Soviet Union Patent No. 1724619 A1 makes reference to the use of sunflower seed husks but in gypsum boards.

Even if the Russian Federation Patent No. 5013331 mentions the use of sunflower seed husks in the manufacture of particle boards, on the one hand the components used in the binding material for the manufacture of boards are different from those used in the method of the present invention and, on the other hand, the process steps are also different as they do not refer to boards of the MDF-type.

SUMMARY OF THE INVENTION

An advantage of the method of the present invention is that the consumption of energy for the production of MDF-boards with sunflower husks is less than that necessary for known MDF boards produced with wood.

Still another advantage of this invention is that, as the raw material are sunflower seed husks, whose only use in the production process is that part thereof are used as fuel, the raw material supply is guaranteed as same is an annually renewable waste material, different from wood, which has multiple applications and which requires at least 10 years before it can be used in industry.

The main object of this invention is to provide a method for manufacturing medium density boards from sunflower seed husk fibers which comprises the steps of a) classifying the desired sizes of sunflower seed husks b) injecting resin in a resin line c) drying the mixture and d) pressing same to form a board, the novelty of which consists in that it comprises the steps of impregnating with steam at pressure the husks resulting from the first classification (a) to simplify the subsequent de-fibration before the resin process (b).

In the preferred embodiment of the method of this invention, during the de-fibration, pressure is kept constant at 3 to 5 bar by means of said injection of steam under pressure.

The composition of the board obtained according to the method of this invention comprises from 6 to 14% of a resin selected from the group comprising melamine resins and formaldehyde urea and the like and the rest is sunflower seed husks, the density of the final board ranging from 500 to 850 $kg/m^3$.

BRIEF DESCRIPTION OF THE DRAWING

The FIGURE shows a diagram of the installation where the method of this invention is carried out.

Both the advantages and the principal object of the invention will be appreciated from the following description of a preferred embodiment of the invention making reference to the attached FIGURE.

According to the method of the present invention and to one embodiment thereof, as it can be observed in the diagram attached hereto, sunflower seed husks are fed "A" into a screen (1) where they are sifted and the biggest pieces are then sent to a disc sifter (2) for their re-feeding, while the dust is eliminated and the rest follows the manufacturing process.

The shive content of the of sunflower husks thus treated is reduced 26% approximately.

The "B" fiber is then fed into a hopper (3) from which it is sent to an impregnation vertical reactor (4) after passing through a valve (11) sealing the reactor's pressure.

This valve (11) can be a rotary valve or a plugscrew feeder valve.

The fiber passes from the impregnation reactor (4) to a digester (12) in order to assure optimum conditions in the next step by means of a thermal treatment with wet steam under pressure in which the steam moisture and the high temperature have a significant softening effect on the ligno-cellulosic material.

The variation of cooking conditions may have an influence on the consumption of energy necessary for the subsequent de-fibration process.

Afterwards, by means of a screw conveyor, the material is carried to a de-fibrator machine (5) under pressure which forwards the "C" discharge to an extraction cyclone.

During the de-fibration the necessary energy is of approximately 0.05 kwh/kg of material obtained and pressure is kept preferably at a level of 4 bar by providing steam constantly from a conventional heater.

The above mentioned energy is approximately 10 times less than that required for the de-fibration of wood fibers.

The fiber leaves the de-fibrator machine (5) towards a blowing line where the resin is injected "E" and consequently it gets mixed with the fibers along the blowing line "D".

In the resin process which takes place in the blowing line, the percentage of formaldehyde urea solid resin injected ranges from 6 to 14%.

In the blowing line, in addition to the resin, other elements in "F", such as paraffin or fire retarding products may be added.

The mixture is then dried in the drier (6) having a variable length and which is fed with air in "G".

The diameter of the drier tubes is of approximately 160 mm and the air is heated by means of a heat exchanger using hot oil, the preferred length of the drier being of 90 meters while the air speed is of 24 meters per second.

Under these conditions, total dwelling time in the drier is from 4 to 6 seconds and the temperature of the air when entering the same drier is from 160° C. to 170° C. and the exit temperature ranges from 66° C. to 69° C.

The dried and resinated fibers "I" are taken to a preformer machine (8) with which a "J" mat is obtained, which mat is then passed through a simple cold press (9) which turns it into a precrompressed "K" mat, which is finally pressed in a hot press (10), thus obtaining the "L" board.

This final hot pressing is carried out at a temperature of about 170° C. during approximately 16 seconds per each millimeter of thickness of the board.

If the content of cellulosic fibrous material derived from sunflower seed husk is taken as 100, the composition of the board obtained would be the following:

| | |
|---|---|
| sunflower seed husk (fiber) | 100 |
| moisture | 6 to 10 |
| solid resin | 6 to 14 |
| paraffin or wax | 0 to 2 |
| other additives (e.g. fire retarders) | 0 to 10 |

This process permitted to obtain boards with a density of 720 to 850 kg/m$^3$, whose swelling after being immersed in water for two hours was from 19 to 25%, while after 24 hours it only increased from 25 to 33%.

It could be observed that by increasing the content of formaldehyde urea resin in the board the swelling of the board when immersed decreased.

Furthermore, it was determined in the tests that by adding paraffin, a sensitive reduction of swelling is obtained.

The formaldehyde urea resin used in the preferred method of embodiment of this invention has a solid content of 40% to 70%.

The internal cohesion strength in the boards obtained according to the method described herein ranges from 0.44 to 0.60 N/mm$^2$.

Even if the method described herein shows that it is possible to obtain boards based on fibers obtained from sunflower seed husks by mixing same with formaldehyde urea resin, the parameters mentioned herein may be varied without departing from the spirit of the invention that is claimed below.

I claim:

1. A method for making medium density boards from sunflower seed husks, which comprises:

(1) selecting sunflower seed husks according to predetermined sizes;

(2) impregnating said selected sunflower seed husks with steam;

(3) digesting said impregnated sunflower seed husks to de-fibrate the same;

(4) mixing said de-fibrated sunflower seed husks with a resin;

(5) drying said mixture; and (6) pressing said dried mixture into a medium density fiber board.

2. The method according to claim 1, wherein during said digestion step, pressure is kept constant between 3 and 5 bar by injecting steam under pressure.

3. The method according to claim 1, wherein said mixing step comprises blowing said de-fibrated sunflower seed husks along a blowing line and injecting said resin into said blowing line.

4. The method according to claim 2, which further comprises injecting paraffin or wax into said blowing line.

5. The method according to claim 1, wherein said pressing step comprises a first and a second pressing operation, said second pressing operation being carried out at a higher temperature than said first pressing operation.

6. The method according to claim 2, wherein said resin is selected from the group consisting of melamine resins and formaldehyde urea resins.

7. The method according to claim 6, wherein said medium density fiber board comprises 100 parts by weight of sunflower seed husk fiber and 6 to 14 parts by weight of a melamine resin or a formaldehyde urea resin.

* * * * *